PLURAL CAMERA TELEVISION CONTROL SYSTEM

Filed Oct. 24, 1950 4 Sheets-Sheet 1

Inventor:
Winslow L. Hurford,
by Merton D. Morse
His Attorney.

Sept. 22, 1953 W. L. HURFORD 2,653,186

PLURAL CAMERA TELEVISION CONTROL SYSTEM

Filed Oct. 24, 1950 4 Sheets-Sheet 2

Inventor:
Winslow L. Hurford,
by Merton D. Morse
His Attorney.

Sept. 22, 1953 W. L. HURFORD 2,653,186

PLURAL CAMERA TELEVISION CONTROL SYSTEM

Filed Oct. 24, 1950 4 Sheets-Sheet 3

Inventor:
Winslow L. Hurford,
by Merton D. Morse
His Attorney.

Inventor:
Winslow L. Hurford,
by Merton D. Morse
His Attorney.

Patented Sept. 22, 1953 2,653,186

UNITED STATES PATENT OFFICE 2,653,186

PLURAL CAMERA TELEVISION CONTROL SYSTEM

Winslow L. Hurford, North Syracuse, N. Y., assignor to General Electric Company, a corporation of New York Application October 24, 1950, Serial No. 191,873

2 Claims. (Cl. 178—7.1)

Figure 1:
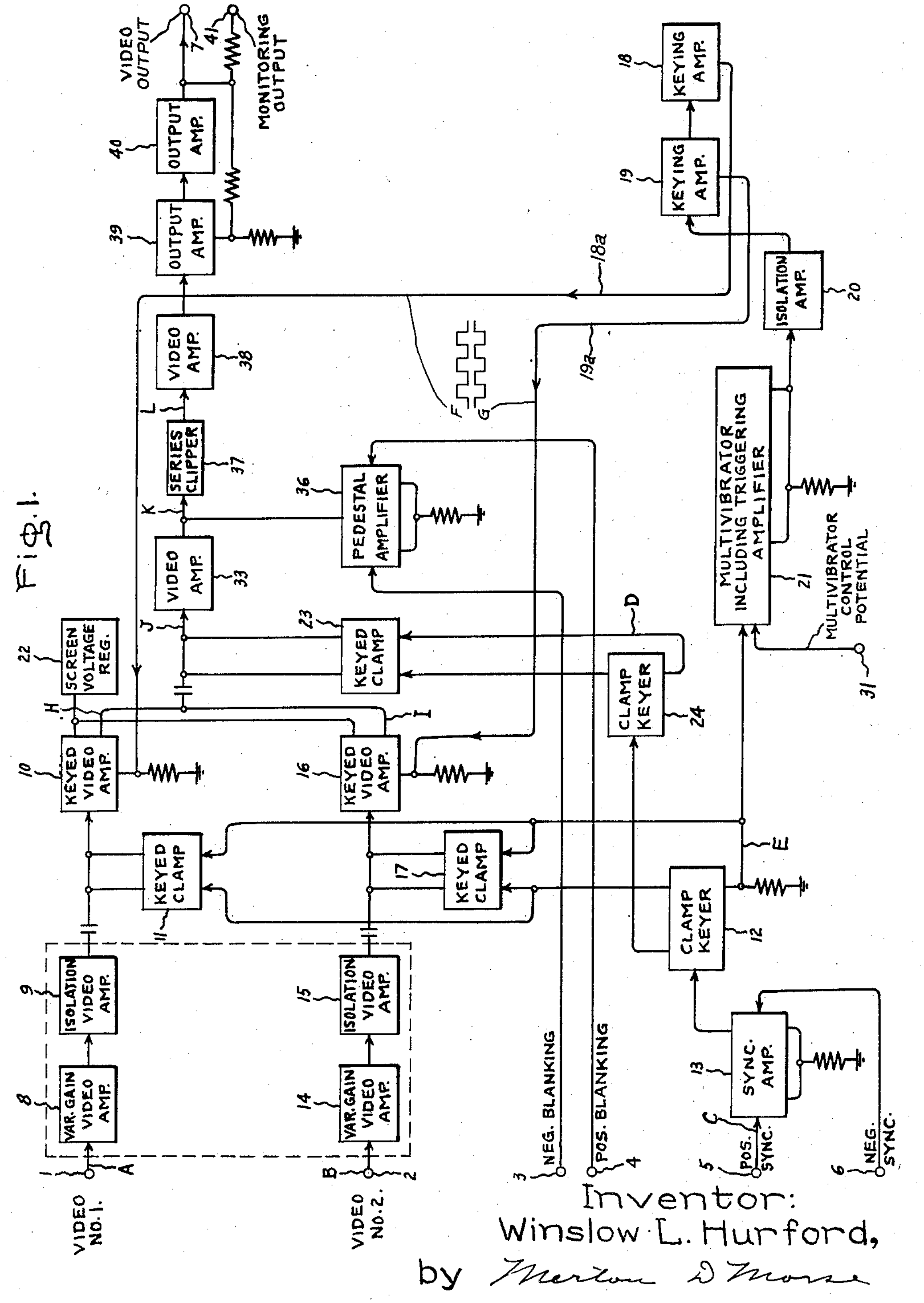

My invention relates, in general, to means for controlling the transmission of signals in an electrical system and relates, in particular, to means in a television system for changing in any desired manner the picture transmission from one subject, being televised by one camera, for instance, to another subject, being televised by another camera, for instance.

In the transmission of a television program it is common practice to use more than one source of television signals, for example, in a program of studio origin it is common practice to use more than one pick-up camera to televise the scenes and to switch from one camera to another during the presentation of the program. Abrupt changes from one scene to another are not particularly pleasing to the eye.

Accordingly one of the objects of my invention is to provide improved means for gradually replacing one video signal in a television system by another so that the effect produced upon the receiver screen is a gradual wiping of one scene off the screen while simultaneously unfolding another scene in a way which is pleasing to the eye.

Another object of my invention is to provide means for switching from one video signal to another at a high rate without introducing objectional switching or transient voltages which impair the performance of the television system.

An exemplary embodiment of the invention comprises a first amplifier having an input circuit and an output circuit and a second amplifier having an input circuit and an output circuit. The input circuits are adapted to be connected, respectively, to first and second sources of video signal. The output circuits are adapted to feed a common utilization circuit. The amplifiers are alternately blocked by pulses obtained from a multivibrator type oscillator which is periodically triggered by the line synchronizing signal. The signal appearing in the utilization means is a video signal made up of a combination of the first and second video signals. The portion of a particular video signal making up the combined video signal is determined by the width of the pulse from the multivibrator which in turn is controlled by a potential applied to the multivibrator. By suitably varying the potential applied to the multivibrator, the portion of the particular input video signal in the combined video signal may be varied from substantially zero to a hundred per cent.

The nature of the control signal applied to the multivibrator and the manner in which it is varied determines the nature of the "wipe" effect produced. A simple wiping operation achieved by varying the potential applied to the multivibrator may be described as follows. Before the transition from one picture to the next, pulses from the multivibrator block out the second picture and allow the first picture to pass through. During the following frame since the control potential applied to the multivibrator has changed, the width of the pulse from the multivibrator has changed causing a small portion of each video line of the first picture to be blocked out and a corresponding portion of each video line of the second picture to take its place.

During following frames, the portion of each video line of the first picture which is blocked out is progressively increased until eventually the picture coming through the first amplifier is completely blocked out and the picture coming through the second amplifier is allowed to pass. Thus, at any time during the wiping operation a combined video line is made up of complementary parts of video lines of the first and second picture. By varying the potential applied to the multivibrator slowly, a slow "wipe" is produced. By varying the potential rapidly, a rapid "wipe" is produced. By applying special wave forms, as control potentials to the multivibrator, special wiping effects may be produced.

Accordingly, another object of my invention is to provide a simple circuit adapted to provide a variety of complex wiping effects determined by the nature of the wave form applied to a control point of the aforementioned circuit.

A further object of my invention is to provide a means for automatically displacing one video signal by another so that as one scene is being wiped off the screen at the receiver another scene at the same time is taking its place.

In motion picture projection, various ways are employed for gradually changing from one scene to another. One of these methods is a "wipe." The present invention is particularly addressed to the production of various wiping effects in the television art. A "wipe" is the passing, at any desired velocity across a screen, of a contour of any desired shape, on one side of which one picture is presented and on the other side of which a second picture is presented.

A feature of the invention is the control of the contour motion and characteristics of the "wipe" by electrical waveforms.

A further feature of my invention is to provide means for wiping a plurality of pictures onto and then off a television screen so that the effect appearing at the television receiver is that of one view displaced by another in any desired manner.

Figure 2:
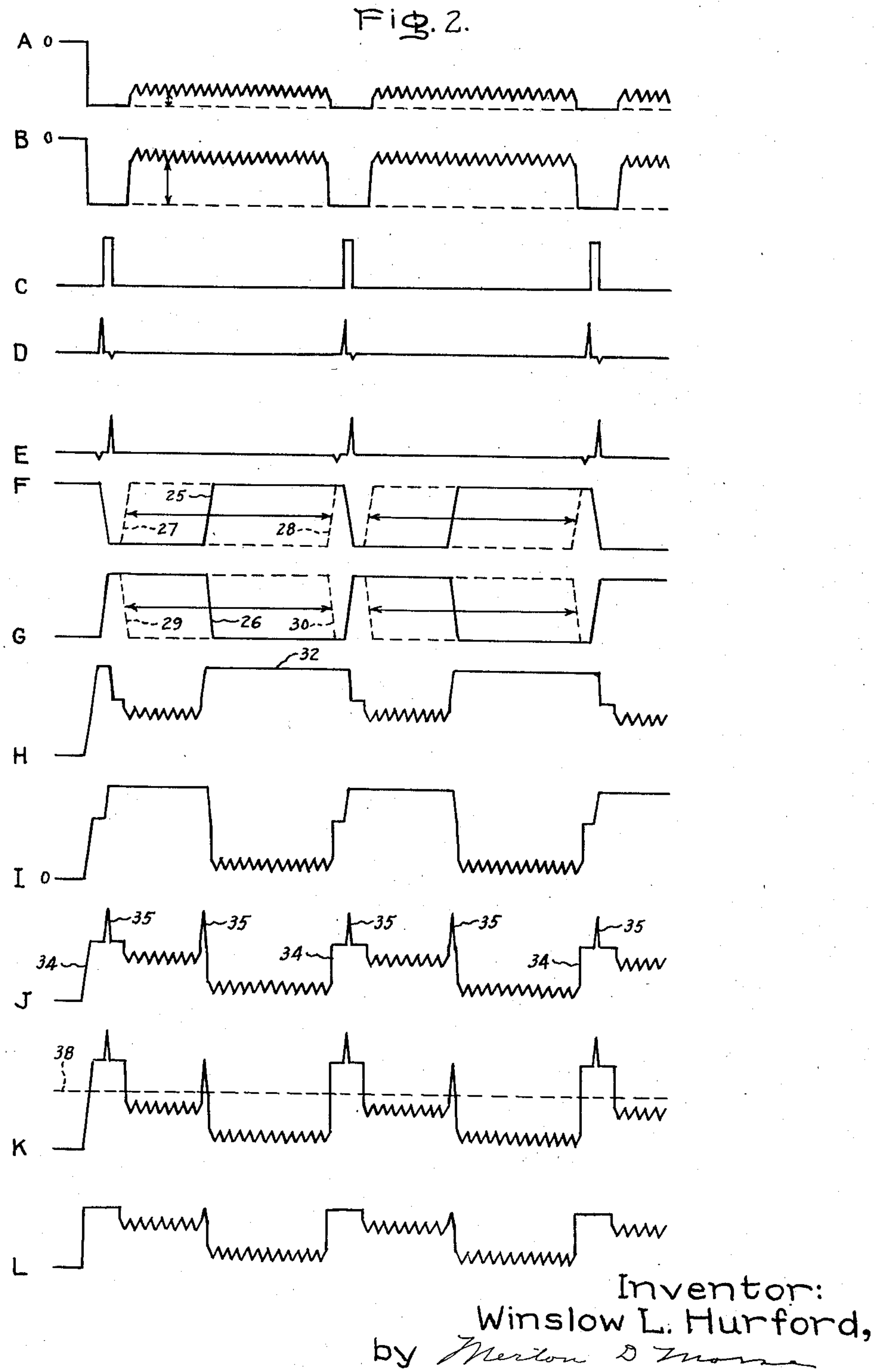
Figure 3:
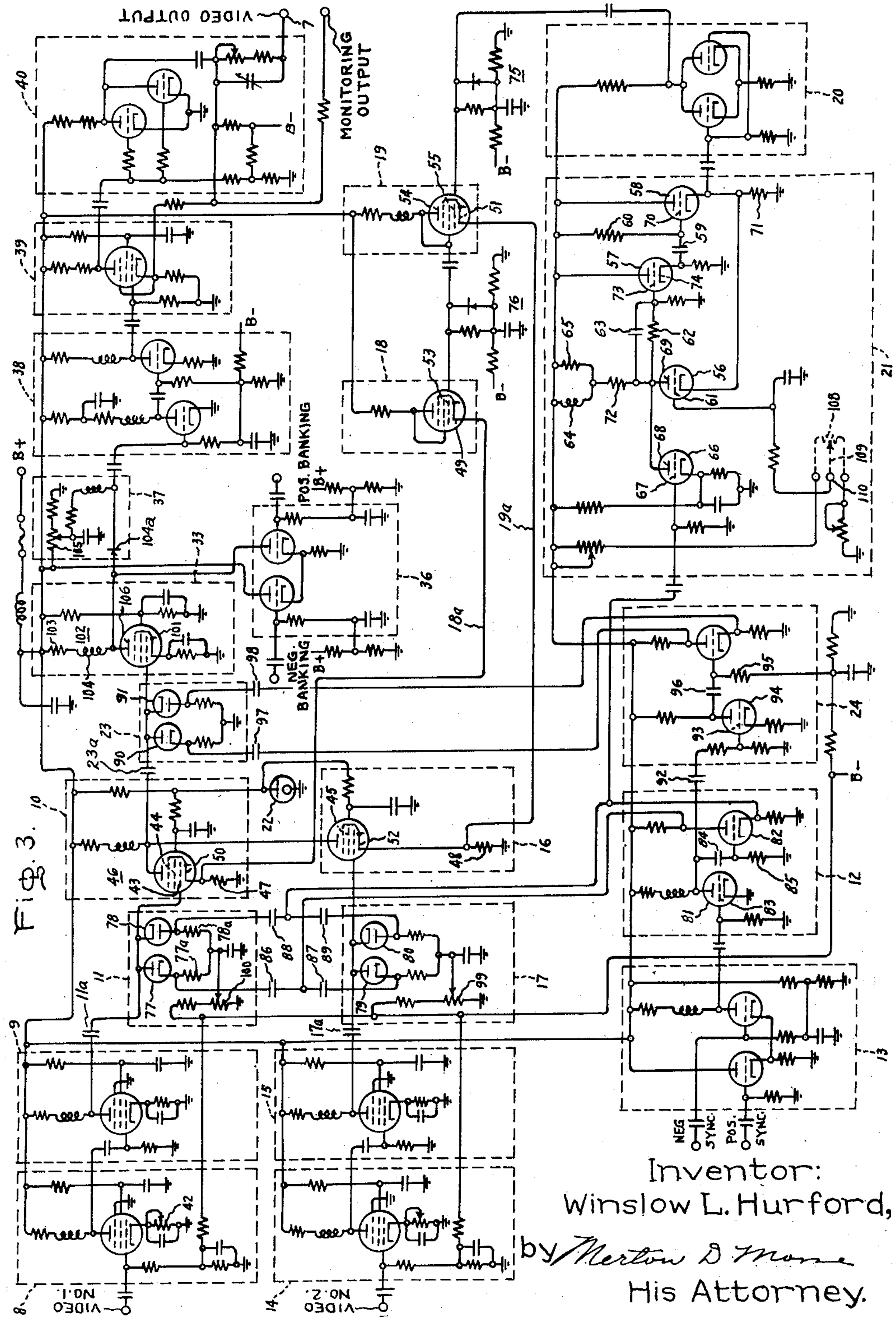
Figure 4A:
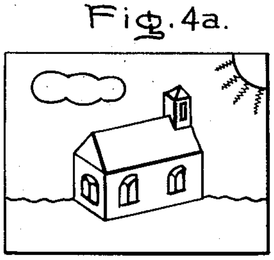
Figure 4B:
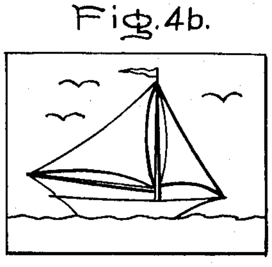
Figure 4C:
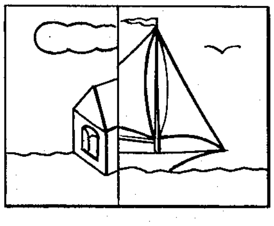
Figure 5:
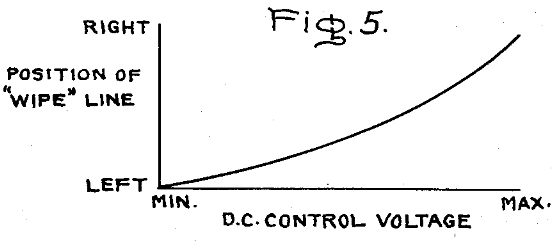
Figure 6:
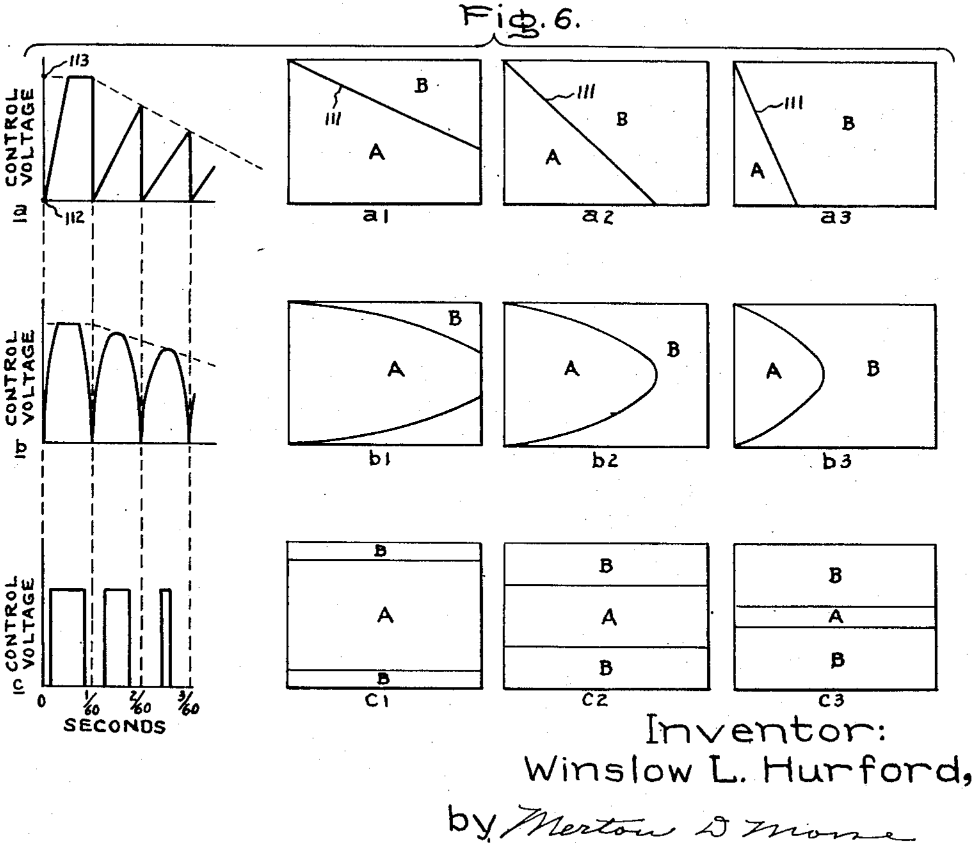

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawings in which Fig. 1 is a block diagram of circuits embodying my invention; Fig. 2 shows various waveforms that appear at various points in the circuit of Fig. 1; Fig. 3 is a schematic diagram of the circuit shown in block form in Fig. 1; Figs. 4*a* and 4*b* and 4*c* illustrate one of the picture effects that may be produced by my invention; Fig. 5 is a diagram showing how the position of the "wipe" line in Fig. 4*c* may be varied by varying the voltage applied to a control point of an exemplary embodiment of my invention; Fig. 6 illustrates a variety of effects that may be produced by applying suitable control voltage waveforms to the control point of an exemplary embodiment of my invention.

The operation of an exemplary embodiment of my invention will best be understood by first considering the block diagram of Fig. 1 in conjunction with the waveform diagram of Fig. 2. The literal designations in the block diagram of Fig. 1 have reference to the waveforms of Fig. 2 which have the same literal designations.

The system of Fig. 1 is supplied with a first and second video signal which may be obtained, for example, from first and second studio cameras televising different scenes. These video signals are applied to terminals 1 and 2, respectively. For the purpose of explanation of the invention, the first video signal applied at terminal 1 is made an essentially white scene while the second video signal applied at terminal 2 is made an essentially black scene. The first and second video signals are shown as waveforms A and B, respectively in Fig. 2.

The first video signal is applied to a variable gain video amplifier 8 in which a control is provided for varying the gain of the amplifier. The video signal is next passed through another video amplifier 9 which functions to isolate the source of video from the keying transients in the input circuits associated with the keyed video amplifier 10. The signal is next applied to the input circuit of the keyed video amplifier 10. The channel through which the second video signal applied at terminal 2 passes is similar to the first video channel and comprises a variable gain video amplifier 14, an isolation video amplifier 15, and a keyed video amplifier 16.

The keyed video amplifiers 10 and 16 which may be regarded as electronic switching means are keyed by pulses derived from multivibrator 21 through keying amplifiers 18 and 19, and an isolation amplifier 20. The keying pulses shown as waveforms F and G in Figs. 1 and 2 and applied to the cathode circuits of the keyed video amplifiers 10 and 16 over conductors 18*a* and 19*a*, respectively, are of opposite polarity thereby permitting only one video amplifier to pass or conduct a signal at one time. The combined video signal appearing at the output of the keyed video amplifiers 10 and 16 comprises a video signal made up of a portion of the video signal from the first video channel and part of the video signal from the second video channel. Relative portions of the video signals comprising the combined video signals are dependent upon the location of the edges 25 and 26 of the keying waveforms F and G.

Waveforms F and G as pointed out above are derived from multivibrator 21 which is a multivibrator of the one-shot variety. Each cycle of operation of the multivibrator 21 is initiated by a pulse derived from the trailing edge of the line synchronizing pulses applied from an external source to the multivibrator through an amplifier 13 and a keyer 12 adapted tto derive a pulse from the synchronizing signal corresponding to the trailing edge of the synchronizing pulses. Waveform E shows the triggering pulses which are applied to the multivibrator 21. The width of the pulses obtained from the multivibrator 21 may be varied by varying the control potential applied to terminal 31. Accordingly, the edges 25 and 26 of keying waveforms F and G may be varied from edge 27 to 28 and from edge 29 to edge 30, respectively, by varying the control potential applied to terminal 31 in order to vary the portion of each video signal appearing in the combined video signal at the output of the keyed video amplifiers 10 and 16.

Waveform J shows the outputs of keyed video amplifiers 10 and 16 which are applied to video amplifier 33. Waveform H shows the contribution of keyed amplifier 10 to the combined video signal shown as waveform J. Waveform I shows the contribution of keyed amplifier 16 to the combined video output signal. With amplifiers 10 and 16 in normal operation, the keyed video amplifier 16 is on during the time that keyed video amplifier 10 is off and vice versa.

Whenever the keyed video amplifiers are switched from a conductive to a nonconductive state or vice versa, spike-shaped voltage pulses or transients are produced in the output circuit of the keyed video amplifiers 10 and 16. These spike-shaped voltage pulses 35 are shown in waveform J. The spiked-shaped voltage pulses 35 extend into the black region of the video signal as shown in waveform J.

In order to facilitate removal of the spiked-shaped voltage pulses 35 from the video signal appearing at the output of the video amplifier 33, a blanking signal which may be either positive or negative is applied through the blanking or pedestal amplifier 36 to increase the amount of blanking or pedestal appearing in the output video signal as shown at waveform K. The removal of the spiked-shaped voltage pulses is accomplished by a circuit arrangement called a series clipper. The series clipper 37 removes the portion of the waveform K shown above the dotted line 38 to produce the waveform L. The signal having waveform L is then passed through a video amplifier 33 and output amplifiers 39 and 40 to the video output terminal 7. The terminal 41 permits monitoring of the video output.

In any A.-C. amplifier of the kind involved in the apparatus of Fig. 1, the passage of a video signal therethrough effects a removal of the D.-C. reference level of the A.-C. signal. The video signal in passing through video amplifiers loses its direct current reference level, for example, an A.-C. signal may be either a positive or negative signal depending on which part of the signal is taken as zero reference level. Accordingly, it is necessary to supply circuits to reinsert the reference level in order to obtain satisfactory performance in subsequent circuits. D.-

C. reinsertion is achieved in the apparatus shown in block form in Fig. 1 by means of circuits referred to as "keyed clamps" 11, 17 and 23.

The keyed clamps 11, 17 and 23 are diode circuits which effect a readjustment of potential appearing at the input to the respective amplifiers 10, 16 and 33 at the end of each video line so that the signal appearing at the output of the video amplifiers has the proper D.-C. or unidirectional component. The keyed clamps 11, 17 and 23 are keyed at the end of each video line by the keyers 12 and 24, respectively. The keyers 12 and 24 render the keyed clamps 11, 17 and 23 operative at the end of each video line to permit readjustment of the aforementioned unidirectional component of signal potential. The clamped keyer 12 is timed or keyed by a synchronizing signal shown as waveform C supplied through synchronizing signal amplifier 13. The clamp keyer 12 differentiates the synchronizing signal to produce two pulses of opposite polarity corresponding to the leading and trailing edges of the synchronizing pulses of the synchronizing signal. The clamp keyer 12 also removes or clips the portion of the differentiated signal corresponding to the leading edges of the synchronizing signal and applies the resultant signal which appears as waveform E in Fig. 2 to one-half of the keyed clamp 11. The clamp keyer 12 also supplies the signal of waveform E with reverse polarity to the other half of the keyed clamp 11. The clamp keyer 12 also keys the keyed clamp 17. The keyed clamp 23 and the clamp keyer 24 function like keyed clamps 11 and 17 and clamp keyer 12 to reinsert the D.-C. component of the video signal lost by passing the video signal through the keyed video amplifiers 10 and 16. The waveform applied from the clamp keyer 24 to one half of the keyed clamp 23 is shown as waveform D in Fig. 2. A similar waveform but of opposite polarity is applied from the clamp keyer 24 to the other half of the keyed clamp 23.

Referring now to Fig. 3, there is shown a schematic drawing of the circuit shown in the block diagram of Fig. 1. Video amplifiers 8 and 9 are conventional video amplifiers. Potentiometer 42 is a gain control for varying the video gain of amplifier 8. Preferably the amplifiers 8 and 9 are completely shielded from each other and other components in the circuit. Video amplifiers 14 and 15 are similar to video amplifiers 8 and 9 and likewise are preferably shielded. The output of video amplifier 9 is supplied to the grid 43 of keyed video amplifier 10 which preferably comprises a pentode in which the screen grid 44 is voltage stabilized, for example, by voltage regulator device 22. The output of video amplifier 15 is supplied to a second keyed video amplifier 16 which also preferably comprises a pentode similarly having its screen grid 45 voltage stabilized. The plates of the keyed video amplifiers 10 and 16 are connected together and to the B+ supply through the common plate load 46. Keying pulses are applied to cathode resistors 47 and 48 of the keyed amplifiers 10 and 16. The cathode 49 of keying amplifier 18 is connected to the cathode 50 of the keyed video amplifier 10 over conductor 18*a*. The cathode 51 of keying amplifier 19 is connected to the cathode 52 of keyed video amplifier 16 over conductor 19*a*. Whenever a positive pulse is applied across either cathode resistor 47 or cathode resistor 48, the corresponding cathodes 47 and 48 are driven positive with respect to the corresponding grids thereby rendering either amplifier 10 or 16 nonconductive. The pulses applied to the grids of the keying amplifiers 18 and 19 are of reverse polartiy since the pulse applied to the grid 53 of keying amplifier 18 is obtained from the plate 54 of keying amplifier 19. The keying waveform applied to the grids 53 and 55 of the keying amplifiers 18 and 19 are obtained through an isolation amplifier 20 from multivibrator 21 which comprises electron discharge devices 56, 57 and 58.

The multivibrator 21 is of the cathode coupled one-shot variety. The cathode follower stage 57 between electron discharge device 56 and 58 of the multivibrator 21 functions to decrease the switch overtime from one state of operation of the multivibrator to another. The width of the pulse obtained from the multivibrator 21 is determined jointly by the time constant comprising capacitor 59 and resistor 60 and by the unidirectional potential applied to the grid 61 of electron discharge device 56. The parallel combination of resistance 62 and capacitor 63 and also the parallel combination of inductance 64 and resistance 65 functions to improve the waveform of the output of the multivibrator 21. Since the resistance 60 and capacitance 59 are fixed, the pulse width of the multivibrator 21 is determined by the potential applied to the grid 61 of the multivibrator 21.

The multivibrator 21 is triggered by means of the triggering amplifier 66, the grid 67 of which is connected to a source of triggering potential. In the embodiment shown the triggering potential is a pulse derived from the trailing edge of the line synchronizing signal and is obtained from the clamp keyer 12. The plate or anode 68 of the triggering amplifier 66 is connected to the plate 69 of electron discharge device 56. Application of a triggering pulse to the triggering amplifier 66 produces the potential drop in the plate circuit of device 56 and initiates the operation of the multivibrator 21.

Briefly the operation of the multivibrator 21 is as follows: At the beginning of the cycle, since the grid 70 of the electron discharge device 58 is connected to B+, the electron discharge device 58 is conducting heavily developing a high bias across cathode resistor 71. Since resistance 71 is common to devices 56 and 58 a large current through resistance 71 places cathode of device 56 at a high positive potential with respect to grid 61 thereby first electron discharge device 56 of the multivibrator 21 is maintained cut-off. When a pulse is applied to the triggering amplifier 68, it draws current through resistor 72 dropping the potential at the plate 69 of device 56. This drop in potential is transmitted to the grid 73 of the cathode coupled amplifier 57, since device 57 is connected as a cathode follower circuit a drop in grid potential causes a drop in the potential at the cathode 74. The drop in potential at the cathode 74 is transmitted through capacitor 59 to the grid 70 tending to drop the potential of grid 70 farther and render the device 58 less conductive. Dropping the potential of grid 70 of the electron discharge device 58 decreases the cathode bias of the devices 56 and 58 sufficiently so that now device 56 of the multivibrator is conducting and the device 58 of the multivibrator is cut-off. As the capacitor 59 charges up to B+ potential, the device 58 eventually becomes conductive again and device 56 becomes nonconductive. The time during which device 56 remains conductive is determined by the potential setting on its grid 61 and by the time constant comprising capacitor 59 and resistance 60. Control potentials may be applied to the grid 61 through potentiometer 108 which forms part of a voltage divider across the B+ supply. Movement of the arm 109 of the potentiometer will cause the width of the pulse, obtained from the multivibrator to change in accordance therewith. The potentiometer 108 may be disconnected from the multivibrator and potentials of various waveforms may be applied at point 110 to produce special wiping effects.

Circuits 75 and 76 are direct current restorer circuits, conventional in the art and functioning to maintain the proper D.-C. reference level for the pulses from isolation amplifier 20 applied to the grids 55 and 53 of keying amplifiers 19 and 18. Were it not for the D.-C. restorer circuits 75 and 76, the D.-C. reference level would change as the width of the pulses applied to the grids 53 and 55 changed. The proper D.-C. restoration of the video signal appearing at the input of amplifier 33 is achieved by means of a keyed clamp 23. Proper D.-C. reinsertion at the inputs of keyed video amplifier 10 and keyed video amplifier 16 is likewise achieved by means of keyed clamps 11 and 17 respectively. The keyed clamps 11, 17 and 23 are circuits which act as switches to connect one side of each of capacitors 11*a*, 17*a*, and 23*a*, respectively, to the center tap on potentiometers 100, 99 and to ground, respectively, during a portion of the horizontal blanking interval. The operation of keyed clamps 17 and 23 will be understood from an explanation of the operation of keyed clamp 11.

During the aforementioned blanking interval the accumulation of charge on capacitor 11*a* develops a certain voltage bias across this capacitor depending on the setting of the potentiometer 100 and on the amplitude of the blanking signal. During the occurrence of the video line the keyed clamp 11 presents an open circuit between the aforementioned side of capacitor 11*a* and the center tap of potentiometer 100 for reasons which will appear hereinafter. Accordingly, the bias developed across capacitor 11*a* during the blanking interval is retained thereon during the video line and is applied in series with the video signal developed in the output of the preceding stage to the input of amplifier 10. Thus every video line applied to the amplifier 10 starts from the same black reference level which corresponds to the level of the blanking signal and which also corresponds to a particular current flow in amplifier 10. Since the black level of the video signal at the input to the amplifier is tied to or starts from a certain fixed potential corresponding to the setting of potentiometer 100 the D.-C. component of the video signal assumes the proper value.

The manner of operation of the keyed clamp 11 to connect one side of capacitor 11*a* to the center tap of potentiometer 100 for only a portion of the blanking interval will be apparent from the following explanation. Negative pulses derived from lagging edges of line synchronizing signal are applied through capacitor 86 to the cathode of diode 77 while positive pulses derived from the lagging edge of the line synchronizing signal are applied through capacitor 88 to the plate of diode 78. Since diodes 77 and 78 are oppositely connected, the application of the aforementioned pulses to the diodes permits current to flow in either direction to capacitor 11 from the center tap of potentiometer 100. Simultaneously with the application of the aforementioned pulses to the diodes 77 and 78, a blanking voltage signal is applied across capacitor 11*a* from the output of amplifier 9. Thus a bias voltage is developed across capacitor 11*a* which is dependent on the voltage at the center of potentiometer 100 and on the amplitude of the blanking signal. Upon the disappearance of the aforementioned pulses the diodes 77 and 78 are rendered nonconductive by positive and negative voltages developed across resistors 77*a* and 78*a* respectively, by the discharging of capacitors 86 and 88, respectively, which became charged during the application of the aforementioned pulses. Accordingly, the aforementioned bias voltage is retained at capacitor 11*a* during the occurrence of the video line. The operation of keyed clamps 17 and 23 is similar to the operation of keyed clamp 11 explained in the foregoing paragraphs.

The double diode clamps 11 and 17 are keyed or actuated in accordance with the above explanation by means of clamp keyer 12 which comprises electron discharge devices 81 and 82. Positive synchronizing pulses are applied to the grid 83 of an electron discharge device 81. The output of device 81 is differentiated by capacitor 84 and resistor 85. The portions of the differentiated pulses corresponding to the trailing edges of the synchronizing pulses are amplified while the other portions of the differentiated pulses are clipped or removed by the amplifier 82. The output from the plate of amplifier 82 is applied through coupling capacitors 86 and 87 to diodes 77 and 79 and the output from the cathodes of amplifier 82 having an opposite polarity is applied through coupling capacitors 88 and 89 to diodes 78 and 80. Potentiometers 99 and 100 set the D.-C. reinsertion level.

The diode clamp 23 comprising diodes 90 and 91 are keyed by means of clamp keyer 24 which is similar to clamp keyer 12. A positive synchronizing signal is applied through coupling capacitor 92 to the grid 93 of device 94 of the clamp keyer 24. The output of device 94 is differentiated by resistance 95 and capacitor 96. The portion of the differentiated pulses corresponding to the leading edge of the synchronizing signal is amplified while the portion corresponding to the trailing edge of the synchronizing signal is clipped so that a pulse signal of one polarity corresponding to the leading edge of the synchronizing signals is applied to one diode 90 through capacitor 97 while a pulse signal of opposite polarity is applied through coupling capacitor 98 to the other diode 91.

The clamp keyer 24 supplies pulses to the keyed clamp 23 which are derived from the leading edges of the synchronizing signal in order to avoid improper readjustment of the potential applied to the input of video amplifier 33 due to the presence of spike-shaped voltage pulses coincident in time with the trailing edges of the synchronizing signal. If the readjustment of potential at the end of each video line at the input to the video amplifier 33 were to take place at a time corresponding to the duration of the trailing edges of the synchronizing signal which also corresponds to the time of appearance of the aforementioned spike-shaped voltage pulses, then a false reference level is set at the input of the video amplifier 33 with the consequent improper unidirectional component of signal at the output of video amplifier 33. Hence, in order to avoid clamping on the spike-shaped voltage pulses in the D.-C. reinsertion process, the keyed clamp 33 is triggered from a pulse obtained from the leading edge of the synchronizing signal as shown in wavefrom C.

Thus, the keyed clamps 11, 17 and 23 effect a readjustment of the bias potential on the grids of the amplifiers 10, 16 and 33 after every horizontal line during the blanking interval.

Further details as to the operation of the D.-C. reinsertion circuits which include the above referred to keyed clamps and clamped keyers may be had by referring to U. S. Patent 2,299,945—Wendt, and to U. S. Patent 2,313,906—Wendt, and to an article by K. R. Wendt appearing in the R. C. A. Review of March 1948.

The video signal from amplifiers 10 and 16 is applied to the grid 101 of video amplifier 33 which preferably comprises a pentode. The output signal appears across plate load impedance 102 comprising resistance 103 and inductance 104. The resistance 103 and inductance 104 is also the load impedance for the blanking or pedestal amplifier to which either a positive or a negative blanking signal may be applied. The addition of additional pedestal signal to the video signal appearing at the output of the amplifier 33 is for the purpose of facilitating removal of the spikes introduced into the video signal by keying amplifiers 10 and 16. The series clipper 37 including diode 104*a* and clipping level setter potentiometer 105 functions to clip off a portion of the black level of the video signal appearing at the output of the amplifier 33 in order to remove the spikes in the manner suggested by dotted line 38 in waveform K of Fig. 2. Since the negative side of rectifier device 104*a* is connected to a source of B+ potential through potential divider 105, the lowest potential to which the plate 106 may drop and still maintain a current through device 104 is limited and is determined by the setting of potential divider 105. The potential divider 105 controls the clipping level denoted by line 38 in waveform K. The output from the series clipper 37 is then applied to amplifiers 38, 39 and 40, and appears at point 7.

Referring now to Figs. 4*a*, 4*b* and 4*c* there is shown the manner in which one scene is wiped off a receiver screen while another scene is wiped on the screen. Fig. 4*c* shows the manner in which the displacement of the scene of Fig. 4*a* by the scene of Fig. 4*b* is achieved on the screen of a television receiver. The line 107 in Fig. 4*c* is gradually caused to move across the composite scene or picture from right to left until the scene of Fig. 4*a* is completely wiped off the screen while the scene of Fig. 4*b* takes its place. Movement of the line 107 is achieved by applying a control potential as shown in Fig. 5 to control grid 61 of the multivibrator 21. By varying the control potential applied by potentiometer 108 to grid 61 the line 107 is made to move from right to left or vice versa.

Referring now to Fig. 6 there is shown schematically the manner in which other wiping effects may be achieved by the system described above. By applying the waveform shown in Fig. 6*a* to the control point 31 of the multivibrator 21, the wiping effect progressively shown in Figs. 6*a*1, 6*a*2 and 6*a*3 is obtained. Figs. 6*a*1, 6*a*2 and 6*a*3 represent successive fields in the transmitted television picture. The waveform of Fig. 6*a* has a repetition rate of 60 cycles per second corresponding to the number of fields per second. Potential corresponding to point 112 applied to the control point of the multivibrator represents a condition in which horizontal lines of scene B only appear on the screen. The potential corresponding to point 113 represents a control potential during which horizontal lines of picture A alone appear on the screen. By varying the control potential periodically at a 60 cycle rate between these two points the progressive effect of wiping picture A off the screen and picture B on the screen is obtained. Fig. 6*b* and Fig. 6*c* show other waveforms which may be applied to the control point 31 to produce the progressive wiping effects shown by Figs. 6*b*1, 6*b*2, 6*b*3 and 6*c*1, 6*c*2, 6*c*3, respectively.

The waveform of Fig. 6*a* may be produced from an ordinary electron discharge device triggered sweep circuit in which the grid bias of the sweep electron discharge device is progressively changed. The waveform of Fig. 6*b* may be produced by a full wave rectifier and a clipper. As the magnitude of output waveform from the rectifier is progressively changed in magnitude, the waveform shown in Fig. 6*a* is produced. The waveform of Fig. 6*c* may be produced by a multivibrator operating at a 60 cycle rate and in which the pulse width is varied as shown.

While I have shown particular embodiments of my invention, it will of course be understood that I do not wish to be limited thereto since many modifications, both in the circuit arrangement and in the instrumentalities employed, may be made and I therefore contemplate by the appended claims to cover any such modifications as fall within the true spirit and scope of my invention.

What I claim as new and desire to secure by Letters Patent of the United States is:

1. The combination, in a television system in which a plurality of images to be televised are scanned line by line, and in which said images are reproduced line by line on a remote screen, of a common transmission channel, a pair of individual channels each carrying signals varying in accordance with respective ones of said images, a pair of electron discharge amplifiers each having an output circuit connected to said common channel and each having an input circuit connected to respective ones of said individual channels, a multivibrator adapted to produce a single control pulse in response to synchronizing pulses applied thereto, means for applying synchronizing pulses synchronized with said line by line scanning to said multivibrator for developing control pulses synchronized with said line by line scanning, means for applying said pulses in one phase to one of said amplifiers and in the opposite phase to the other of said amplifiers whereby said amplifiers are rendered alternately conductive at said line by line scanning rate, thereby line by line a portion of said one image and a complementary portion of said other image is produced on said remote screen, means in association with said multivibrator responsive to a unidirectional control potential for complementarily varying the duration of the control pulses applied to said amplifiers in accordance with the variations of said control potential, means for applying a unidirectional control potential varying in a predetermined manner to said control potential means to vary complementarily in a predetermined manner portions of said two images appearing simultaneously on said screen.

2. The combination, in a television system in which a pair of images to be televised are scanned line by line, and in which said images are reproduced line by line on a remote screen, of a common transmission channel, a pair of individual channels each carrying signals varying in accord with respective ones of said images, a pair of electron discharge amplifiers each having an output circuit connected to said common channel and each having an input circuit connected to respective ones of said individual channels, each of said amplifiers including means responsive to a voltage of predetermined magnitude and polarity applied thereto for rendering said amplifiers nonconductive, a pair of electron discharge devices, circuit means for rendering each of said devices conductive when the other is nonconductive, circuit means for rendering conductive that one of said devices that is nonconductive whereby that device becomes conductive and the other device becomes nonconductive, circuit means for rendering said one device nonconductive again after a predetermined interval, said second circuit means including means for synchronizing the periods of conduction of said one device with said line by line scanning, means for deriving an output from one of said devices having an amplitude exceeding said predetermined magnitude, means for applying said output in one polarity to the voltage responsive means of one of said amplifiers and in the opposite polarity to the voltage responsive means of the other of said amplifiers, whereby said one amplifier becomes nonconductive during the conduction of said one device while said other amplifier becomes nonconductive and said other amplifier becomes conductive during the conduction of said other device while the said one amplifier becomes nonconductive, thereby line by line a portion of said one image and a complementary portion of said other image is produced on said remote screen.

WINSLOW L. HURFORD.

References Cited in the file of this patent

UNITED STATES PATENTS

| Number | Name | Date |
|---|---|---|
| 2,233,317 | Konkle | Feb. 25, 1941 |
| 2,240,420 | Schnitzer | Apr. 29, 1941 |
| 2,244,239 | Blumlein et al. | June 3, 1941 |
| 2,286,540 | Hanson | June 16, 1941 |
| 2,490,561 | Ussler | Dec. 6, 1949 |
| 2,546,338 | Glassford | Mar. 27, 1951 |
| 2,613,263 | Hilburn | Oct. 7, 1952 |